INVENTOR,
CLINTON E. BROWN

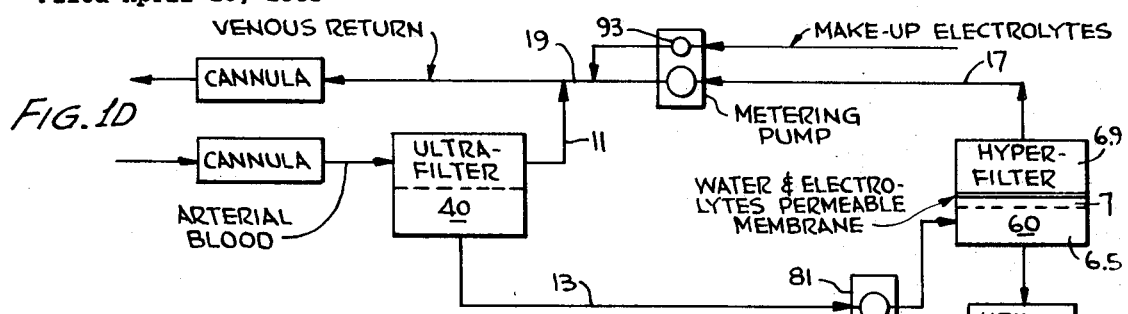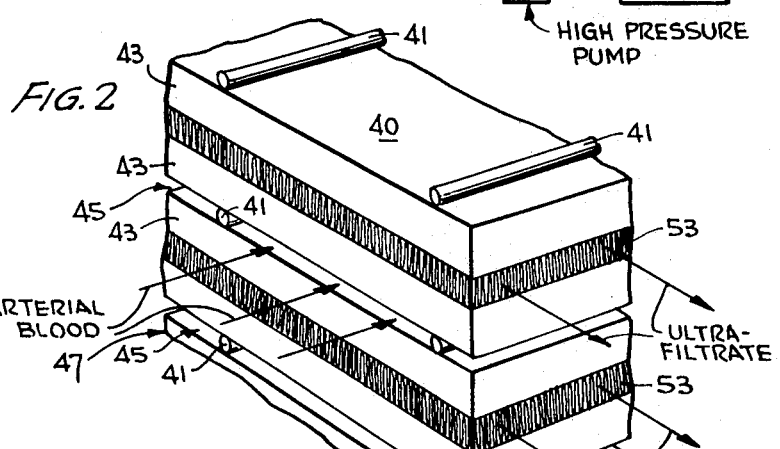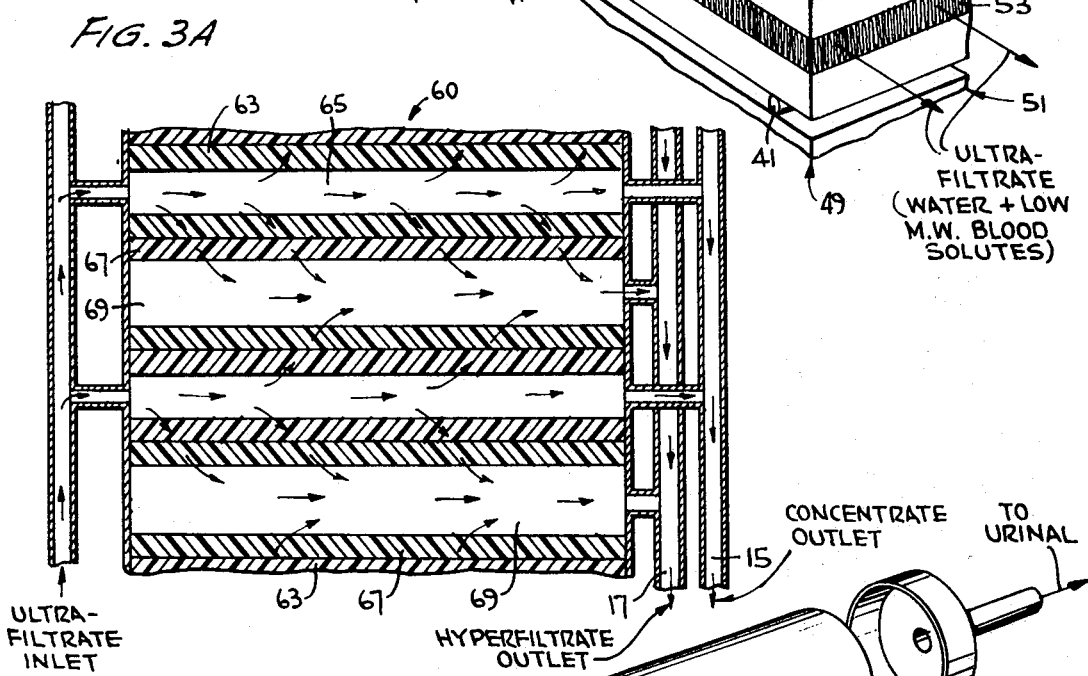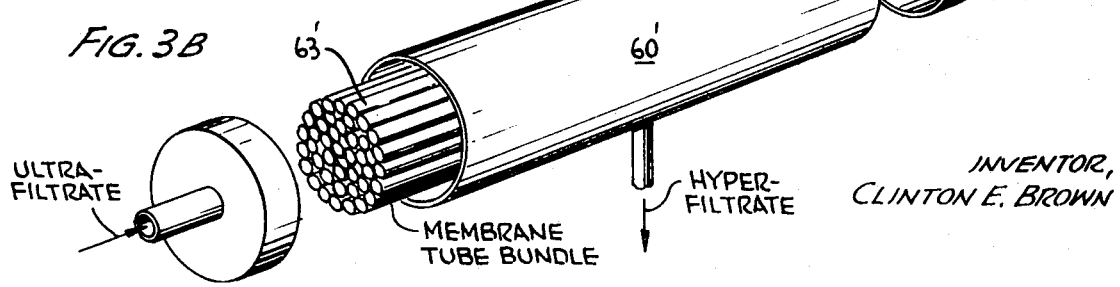

May 18, 1971 C. E. BROWN 3,579,441
BLOOD PURIFICATION BY DUAL FILTRATION
Filed April 19, 1968 4 Sheets-Sheet 3
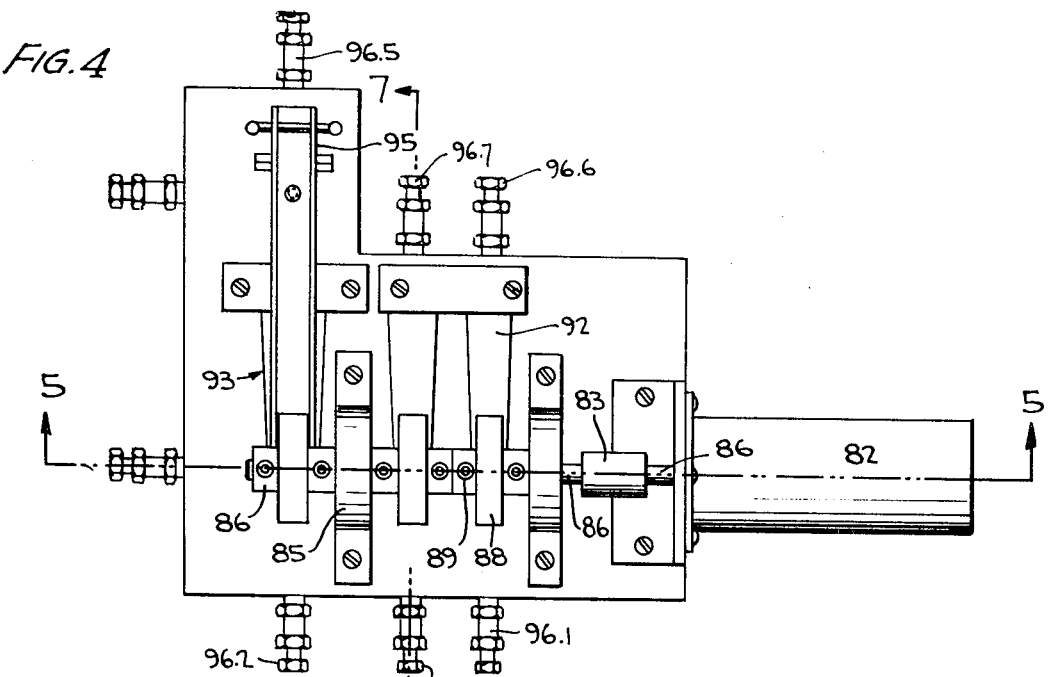
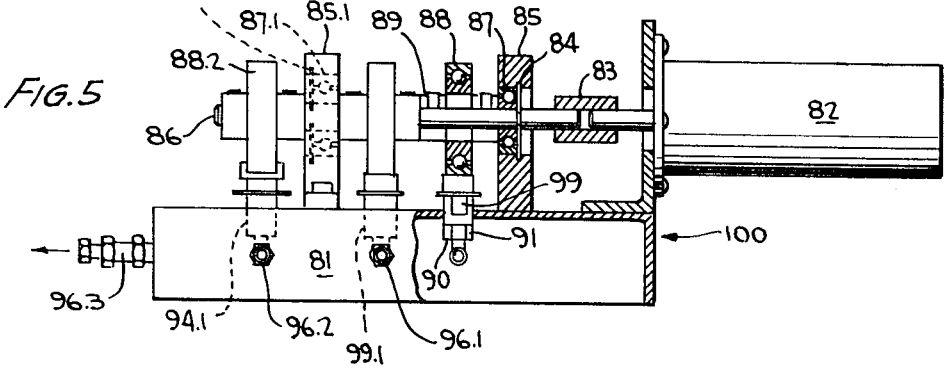
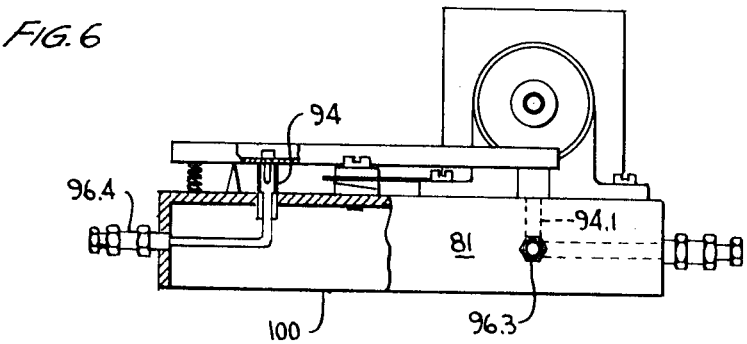
INVENTOR,
CLINTON E. BROWN

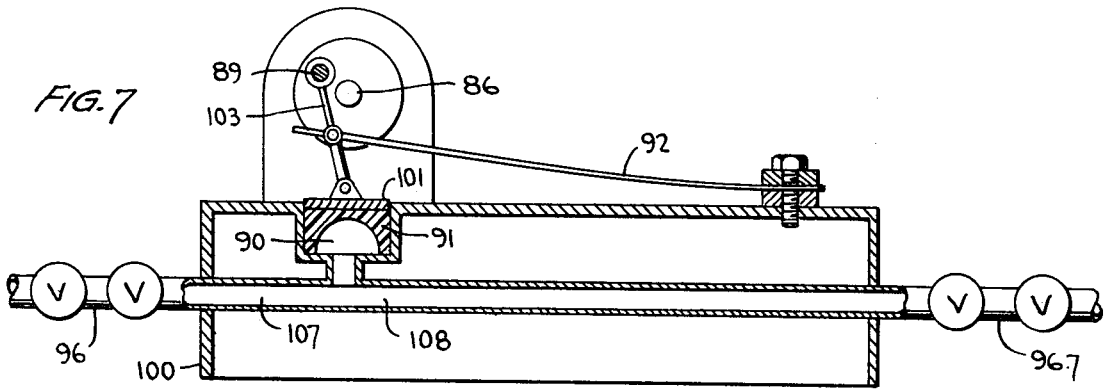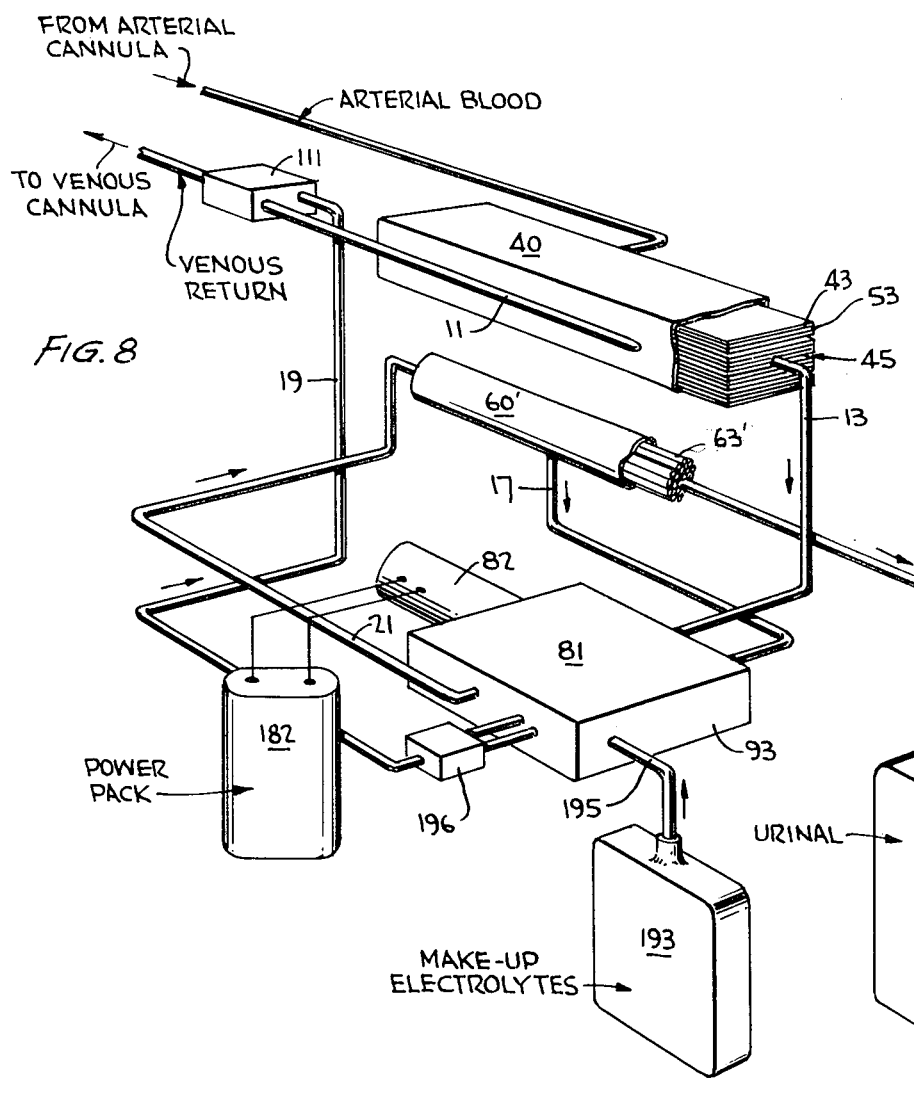

United States Patent Office 3,579,441
Patented May 18, 1971

3,579,441
BLOOD PURIFICATION BY DUAL FILTRATION
Clinton E. Brown, Silver Spring, Md., assignor to
Hydronautics, Incorporated, Laurel, Md.
Filed Apr. 19, 1968, Ser. No. 722,727
Int. Cl. B01d 31/00, 13/00
U.S. Cl. 210—23
25 Claims

ABSTRACT OF THE DISCLOSURE

An extra-corporeal device employing filtration means performs the functions of a natural kidney in the following manner: arterial blood is filtered by a highly selective filtration means which retains macromolecular weight blood constituents such as blood cells, fat droplets, high molecular weight polypeptides and high molecular weight lipids, while permitting the passage of water and low molecular weight solutes. The water and solutes are then passed through a second filtration means or combination of filtration and electrodialyzing means which permits only the passage of pure water or pure water and electrolytes. The purified filtrate from this second stage is then combined with a controlled amount of make-up electrolyte solution, and this combined solution is then mixed with the macromolecular weight blood constituents retained by the first filtration means to form the venous return.

FIELD OF THE INVENTION

The invention concerns a new development in the field of artificial kidneys. In recent years the use of such devices has prolonged the lives of human beings with damaged or inoperative kidneys. The physiology of the human kidney is fairly well understood and involves the removal of nonvolatile wastes from the bloodstream and the continuous regulation of the blood composition such that the conditions in body tissues necessary for the life of cells are maintained. Accordingly, when the kidneys are not operating properly, these functions must be performed by some means lest conditions of uremia and electrolyte imbalance develop. Once these conditions exist, the bloodstream becomes increasingly toxic.

DESCRIPTION OF THE PRIOR ART

Artificial kidneys have been developed which, when used for several hours several times per month are capable of reducing the level of concentration of toxic substances in the blood. A "wash" solution, carefully formulated so as to be isotonic to blood, is introduced into these devices such that certain desirable constituents of the blood, e.g. electrolytes, are not lost.

It can be seen that the use of these prior art devices raises several serious problems. First, a high volume of reconstituting or "wash" solution is required. This large amount of liquid is generally supplied from a bulky and immobile reservoir. Second, prior art devices are used discontinuously. Periods of dialysis shorter than six hours twice a week appear to be ineffective, and during the dialysis period the patient is immobile. Another undesirable but unavoidable effect of discontinuous use is a periodic build up and withdrawal of wastes. Just before the use of a prior art artificial kidney, the concentration of various solutes in the patient's blood stream is abnormally high, and just after treatment the concentration is abnormally low. Third, the known devices are expensive to use and require the assistance of trained personnel. Furthermore, in none of the artificial kidneys devised to date has the problem of blood clotting been completely obviated, and it has generally been the practice to employ heparin or other anti-clotting agents.

Recently it has been suggested that the functions of a natural kidney could be better approximated through the use of ultrafilters rather than dialysis. However, until now no equivalent to the natural kidneys' function of automatic and continuous regulation of blood components has been discovered. Nor has an artificial means been found for regulating the concentration of blood components that does not employ large amounts of a reconstituting or "wash" solution. More particularly, the use of an ultrafilter has formerly required a very large reservoir of make-up fluid in order to replace the water lost as filtrate. Furthermore, no practical solution has been found to the problems caused by caking and polarization at the surface of the ultrafilter. The use of turbulence to dislodge polypeptide caking has been suggested but is not practical because of the limited pressure drop available from the arteries.

OBJECTS OF THE INVENTION

Accordingly, it is an object of this invention to provide a compact, mobile device for removing nonvolatile wastes from the blood while regulating the concentration of desired blood solutes.

It is another object of this invention to provide a device which approximates as closely as possible the performance of a natural kidney.

A further object of this invention is to provide an artificial kidney device which may be conveniently used continuously.

A further object of this invention is to provide a continuously usable artificial kidney in which make-up electrolytes can be supplied as small amounts of a solution which is highly concentrated and of fixed proportions.

A further object of this invention is to provide an artificial kidney that automatically regulates the concentration of electrolytes in the blood stream without the necessity of changing the composition of the electrolyte make-up solution.

A further object of this invention is to provide an artificial kidney using ultrafiltration to remove wastes and hyperfiltration to recover water for reconstituting retained blood plasma.

A further object of this invention is to provide an artificial kidney which removes wastes by ultrafiltration and has compact means for overcoming osmotic back-pressure.

Still another object of this invention is to provide a wearable artificial kidney that can be used by the patient himself with little assistance from trained medical personnel.

A further object of this invention is to provide an artificial kidney that employs filtration means rather than dialyzing means without the necessity of generating a turbulent flow over the filter.

A further object of this invention is to provide means for treating uremia by restoring and continuously maintaining relatively constant concentrations of blood solutes closely approximately those of a person with well-functioning kidneys.

Still a further object of this invention is to provide an improved artificial kidney in which thrombogenic conditions are minimized and which eliminates the need for the injection of anti-clotting agents such as heparin.

Other objects will become apparent, and a fuller understanding of the invention may be had by referring to the following description and claims taken in conjunction with the accompanying drawings.

BRIEF SUMMARY OF THE INVENTION

The invention herein disclosed employs two filtration stages, a high pressure pump, a metering pump, and a small reservoir for make-up electrolytes. The combination of these elements forms a compact device which can be worn on the body without interference with sleep, free movement, daily toilet, sexual activity and so forth. More particularly, arterial blood is drawn off from a cannula, as is conventional in the art, and fed to an ultrafilter which retains macromolecular substances in the blood with a molecular weight higher than 10,000 or so, and generally at least 40,000–50,000, which includes blood cells, fat droplets, lipids, high molecular weight polypeptides and the like. The blood, after passing through the ultrafilter, has an increased hematocrit, hereinafter called the HB, i.e. the increased hematocrit blood. The IHB constitutes, in part, the venous return, as will be more apparent hereinafter. The ultrafilter is designed to reduce polarization in that it consists of small blood channels in which the filtering action takes place on a stream of blood flowing parallel to the surface of the filter. The blood channels may be tubules or spaces between laminae. Low molecular weight solutes and water, which make up the filtrate coming from the ulterfilter, are passed to a second filtration stage, which can comprise a hyperfilter (similar to the ultrafilter) which permits only water to pass, or a hyperfilter in composition with a low-power electrodialysis device, or a so-called hyperfilter mosaic, which is permeable only to water and electrolytes. The purpose of the second stage filtration is to remove urea, sugars, uric acid, creatinine and the like from the first filtrate. The second filtrate is thus either pure water or water containing only electrolytes, such as sodium chloride and the like. The materials retained by the second filter or filtering system are wastes and are deposited in a small cannister which is periodically emptied. Even when the second filtration stage comprises a hyperfilter-electrodialysis system or a so-called mosaic hyperfilter, the precise electrolyte concentration desirable for venous return is not likely to be obtained. Therefore, according to the present invention a metering pump supplies a predetermined amount of make-up electrolyte from a small reservoir containing highly concentrated essential electrolytes, such as sodium chloride, potassium chloride, sodium bicarbonate, etc. to this second filtrate. In most cases the bulk of the make-up solution will be concentrated saline. The second filtrate containing the make-up electrolyte is then combined with the IHB retained by the ultrafilter, resulting in whis is essentially whole blood purified of metabolic wastes, and constitutes the venous return.

The net result of all the elements of the invention working in combination is that nitrogenous wastes are discarded, plasma and water are retained, and the concentration of electrolytes is adjusted. In some embodiments of the invention, dissolved sugars may be lost, but these may be replaced orally as is conventional. A high-pressure pump (which may be powered by a small battery pack) drives blood through the entire artificial kidney system such that osmotic back-pressure is overcome.

It can readily be seen that the present invention mimics the functions of a normal kidney more closely than any prior art device. The first filtration stage approximates the filtering effect of the renal corpuscles, while the combination of the second filtration stage and the electrolyte make-up feature approximates the electrolyte regulatory effect of the renal tubules.

In order that the present invention may be fully understood, illustrative embodiments are described in detail and shown in the accompanying drawings in which FIGS. 1A, 1B, 1C and 1D are schematic representations of methods and apparatus of the invention, in which 1A is the basic embodiment, and 1B, 1C and 1D are alternative embodiments, being variations of the basic embodiment;

FIG. 2 is a fragmentary perspective view of the construction details of the ultrafilter of this invention;

FIG. 3A is a cross-sectional view of a part of the hyperfilter of this invention;

FIG. 3B is an exploded perspective view of an alternative embodiment of the hyperfilter of this invention;

FIG. 4 is a plan view of the motor, high-pressure pump and metering pump of this invention;

FIG. 5 is a cross-sectional view taken along line 5—5 of FIG. 4;

FIG. 6 is a side elevational view of the apparatus of FIG. 4;

FIG. 7 is an enlarged cross-sectional view taken along line 7—7 of FIG. 4; and

FIG. 8 is an exploded view of one embodiment of an artificial kidney constructed according to this invention.

In the figures that follow like reference numerals denote similar parts in the different embodiments.

Figure 1A:
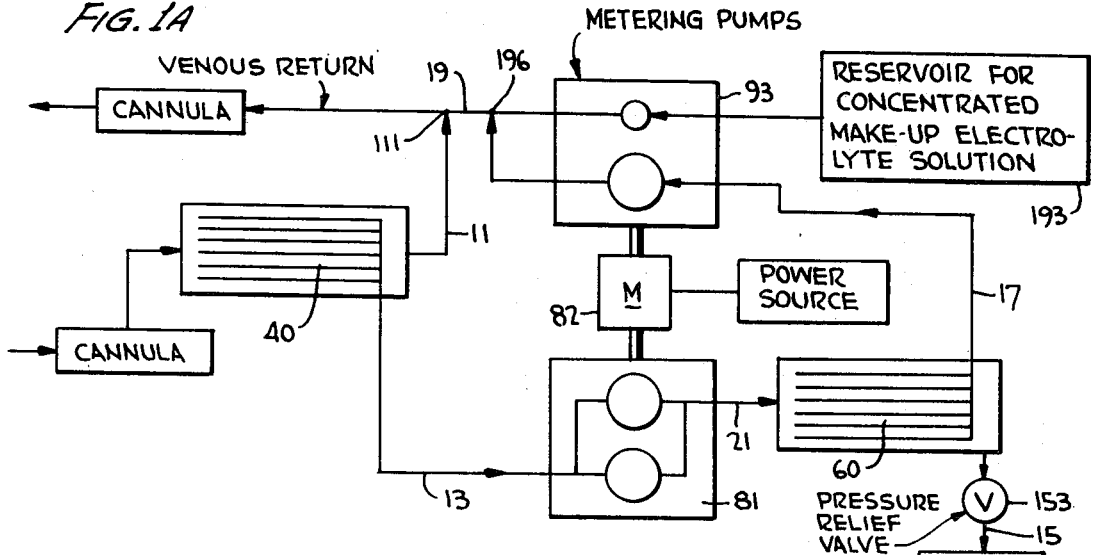

Referring primarily to FIGS. 1A and 8, it will be seen that arterial blood is drawn off from the body by a conventional cannula and forced by the pumping action of the body's heart into the ultrafilter, while a filtrate 13 is drawn off from the ultrafilter by the suction side of the high pressure pump. The concentrated arterial blood IHB 11, after its passage through the ultrafilter, is combined with the filtrate of the hyperfilter and make-up solution, as will be seen more fully hereinafter. FIG. 8 shows the ultrafilter 40 as a stack of filtration elements 43 which are rectangular in shape. It will be noted that the blood flow is parallel to the filter elements 43, and the filtrate 13 is transversely drawn off. The internal construction details of the ultrafilter 40 can be better understood by referring to FIG. 2, which is discussed below. The filtrate 13 is channeled through the pump 81 and forced through the hyperfilter (60' of FIG. 8) by the high-pressure side of the pump. The internal construction details of the hyperfilter can be understood by referring to FIGS. 3A and 3B discussed below. The second filtrate 17 emerging from the hyperfilter is essentially pure water, and the non-permeating solutes 15 are deposited in the detachable urinal 151. It will be seen from FIG. 8 and from FIGS. 3A and 3B, discussed below, that the hyperfiltrate 17 is, like the ultrafiltrate 13, drawn off transversely and continuously, while the input 21 to the hyperfilter, which is the ultrafiltrate 13 under pressure, travels through the hyperfilter with a motion parallel to the filtering surfaces (63' of FIG. 8) and emerges as a concentrated solution of low molecular weight solutes, such as urea, creatinine, uric acid, electrolytes and sugars. Pressure is maintained at the proper level in the second (hyperfiltration) stage by the pump and pressure relief valve 153 in the urine rejection line. This relief valve is designed to permit a continuous flow of ultrafiltrate 13 through the hyperfilter and a continuous flow of wastes 15 to the urinal 151 without loss of pressure across the hyperfilter 60 (or 60') and without back-up from the urinal 151 in the event of a pump failure or shut-down. Due to the high volume of recovered water 17, the volume of waste 15 is of manageable proportions, and the urinal 151 need be detached and emptied only infrequently.

As previously noted, pump 81 provides the pressure across the hyperfilter. The pump and the metering system 93 are driven by A.C. or D.C. motor 82 (a D.C. motor is preferred) by power back 182, which preferably comprises rechargeable storage batteries. The suction side of the metering system 93 draws the hyperfiltrate 17 and a controlled amount of concentrated make-up electrolyte solution 195 from the make-up reservoir 193, and forces them with pressure into the same efflux line at 196 to form an aqueous solution 19 with the proper concentration of sodium, potassium, bicarbonate, phosphate, chloride and sulfate ions and the like for return to the blood stream. This solution 19 is mixed with the retained IHB 11 to form reconstituted whole blood, which is returned to the body via the venous cannula. Also as noted above, the IHB efflux 11 and the solution 19 come together in chamber 111. This chamber provides an added margin of safety in the operation of this invention in that it contains bacterial filters. Although sterile conditions are maintained throughout the elements of the artificial kidney of this invention, sterility of the whole blood returned to the patient's bloodstream is assured by these bacterial filters.

Referring to FIG. 2, the internal construction details of the ultrafilter 40 of this invention will become evident. This perspective view is fragmentary in that only two complete arterial blood channels and filtrate channels are shown. In practice, the ultrafilter of this invention contains numerous blood and filtrate channels. The design shown is a laminar arrangement; however, it will be understood that other arrangements may be used, such as tubules, in which the blood flow is parallel to the longitudinal axis of the individual tubules and the filtrate is drawn off from the walls of the tubules. In either case the polarization of the surfaces of the blood channels is negligible. It will also be understood that the depth of the blood channels measured from the leading edge 49 of the ultrafilter to the rearmost edge 51 and the width of the face of the filter measured between the farmost edges 47 and 49 may be of various dimensions. The total area of the blood channels will be from about 1,000 to 2,500 cm.$^2$. It is preferred, however, that the total area of the blood channels is about 2,000 cm.$^2$ which corresponds to a flow rate of filtrate of about 30 liters per day, or 21.00 milliliters per minute. Increased flow rates can be desirable in which case the total area of blood channels will be increased accordingly. The ratio of the dimensions measured from 47 to 49 and 49 to 51; that is, the ratio of the width of the blood channels 45 to the depth of these channels can be varied from about 5 to 1 to 15 to 1, but we prefer a ratio of about 12½ to 1. It is the desideratum to have the spacing as small as possible and still have integrity of construction.

As seen in FIG. 2, the laminer construction consists of a series of membranes, each designated 43, a series of porous supports 53 which are also filtrate channels, and a series of parallel rows of cylinder-shaped spacers 41, all arranged such that the space between the surfaces of two membranes 43 provides a blood channel 45. Various membranes suitable for so-called ultrafilters may be used as the filtering elements 43, such as Diaflo UM–1 (Amicon Corporation) and Abcor, Inc. No. 26315. The Diaflo membrane is produced from a stoichiometric mixture of poly-(sodium styrene sulfonate) and poly-(vinylbenzyl-trimethyl ammonium chloride) in a quaternary solution with water, acetone and a strong electrolyte such as sodium bromide. Additionally, cellulosic membranes can be selected. In selecting membranes it can be desirable to employ membranes which have heparin or other anti-blood clotting agents incorporated in the membrane. With the exception of the membrane 43, the other materials used in the construction of the ultrafilter device of the invention are substantially non-thrombogenic, i.e., not tending to produce blood clots. Preferred non-thrombogenic materials are heparinized polytetrafluoroethylene, heparinized surgical grade silicone rubber, and the like. Thus, the spacers 41 are preferably polytetrafluoroethylene mono-filaments marketed by the duPont Company under the tradenames "Teflon TFE," or "Teflon FEP"; but the porous support material forming the filtrate channels 53, since these channels are not directly in contact with blood, can comprise nylon cloth, or the like. The preferred thickness of these channels 53 is from about 50 to 150 microns. The spacing 45 between membranes 43 is preferably as small as possible down to about 7 microns which is the size of a red blood cell. Accordingly, spacings 45 will range from about 7 microns up to about 100 microns.

It will also be seen that the arterial blood passes through the blood channels 45 parallel to the Teflon spacers 41 and the water and blood solutes with molecular weight less than 10,000 or so flow or ooze perpendicularly to the blood flow through the membranes 43 into the filtrate channels 53, the ultrafiltrate being drawn off transversely from the filtrate channels 53. The design described above permits the complete ultrafilter unit to be housed in a rectangular box with dimensions of 17 x 4 x 3 centimeters, the core of the filter unit being approximately 15 x 3 x 2 centimeters in volume. The assembled unit weighs approximately 300 grams. The disclosed design reduces polarization without subjecting the blood in the channels 45 to excessive shear stress.

FIG. 3A shows the details of a hyperfilter 60 designed similarly to the laminar assembly of the ultrafilter. The instant assembly consists of a series of spaces each designated 65, defined by membranes designated 63, the membranes being supported by porous plates 67. Between each set of porous plates 67 is another space 69 from which the hyperfiltrate is drawn off by the manifold as shown. This hyperfiltrate 17 consists essentially of pure water or pure water and electrolytes. The inlet manifold allows an aqueous solution drawn from the ultrafiltrate (53 of FIG. 2) to pass into the spaces 65. The pure water, or water plus electrolytes, diffuses through a membrane 63 into the spaces 69 in a direction that is essentially perpendicular to the flow through the spaces 65. The material 15 emerging from the spaces 65 and into the outlet manifold is highly concentrated and contains wastes such as urea. The construction of the hyperfilter can differ in some detail from the ultrafilter for various reasons. First, blood is not in contact with any element of the hyperfilter; therefore, non-thrombogenic materials need not be used. Second, the solutes to be retained in spaces 65 are of much lower molecular weight than the solutes retained by the ultrafilter. The preferred material to be used for membrane 63 is cellulose acetate. These membranes are prepared by dissolving the cellulose acetate in acetone and a conditioning agent, generally formamide. This solution is formed into sheets, and after a preliminary short air evaporation, the material is immersed in cold water, thus removing the acetone and formamide and gelling the cellulose acetate. Subsequently, the film is conditioned by heat treatment at 70 to 90° C. The surfaces of the membranes 63 in contact with the spaces 65 are under high pressure. In our basic embodiment we prefer at least 600 p.s.i. The total area of these surfaces may vary, and we prefer an active total membrane surface of approximately 1,000 to 3,000 square centimeters, or a gross area of about 1,500 to 4,500 square centimeters. Again, the membranes of the finished package may be of various dimensions, and in this connection we prefer fifteen centimeters length by about five centimeters width by about one centimeter or less thickness. This would mean that the entire hyperfilter would comprise about twenty-two membranes 63. The spacing 65 should be about 50 to 300 microns.

FIG. 3B illustrates an alternative design 60' for the hyperfilter 60 of this invention. The membranes tubes 63' shown in the figure are produced by confining a plug of cellulose acetate solution in acetone in a tube of appropriate diameter, and blowing the plug by means of a column of air under pressure. The advancing air column forces the cellulose acetate solution towards the walls of the support tube, forming it into a thin cylindrical-shaped tube concentric with the supporting wall. A column of water following the air removes the acetone from the mixture, and coagulates the cellulose acetate into a solid hollow tube. Tubes with a diameter of less than 500 microns can easily be made. The preferred diameter is about 250 microns. Thus, the tubes shown in the drawing are greatly enlarged for purposes of illustration. The tubes themselves have little inherent mechanical strength and are supported by porous support tubes, not shown, made from sintered stainless steel, Inconel, silver, tantalum and the like. Nonmetallic materials suitable for making support tubes are glass fibers stiffened with epoxy or polyester resin, woven nylon or glass braid stiffened with resin and fillers, sintered ceramics, and sintered glasses.

The tube should have an outside diameter of about 500 microns, should be microporous, should be able to withstand high internal pressures, and should be inert to body fluids, both in the sense of being corrosion resistant and in the sense of not releasing toxic substances. Thus, the list of materials given above is not intended to exhaustive, since any material that satisfies these conditions may be used. The tubular type membrane assembly would be somewhat smaller in volume than the flat plate assembly; a 15 centimeter length, a 1.7 cm. diameter, and an overall weight of about 150 to 200 grams can be obtained in practice. Both hyperfilters 60 and 60' are designed to reduce polarization to a negligible minimum.

FIGS. 4, 5, 6 and 7 show the details of the preferred embodiment of the novel high-pressure micro-pump and metering system assembly 81 of this invention. The precision-ground shaft 86, which is common to the micro-pump and metering system, of this assembly is driven by a suitable electric motor 82 through a sleeve coupling 83, a shaft speed of about 3,600 r.p.m. being preferred. The shaft 86 is supported by two shaft hangers 85 and 85.1 which house ball-bearings 87 and 87.1 and retainer rings 84 and 84.1. Turning with the shaft 86 is a ball-bearing cam system which converts the rotary motion of shaft 86 into reciprocating motion. An example of an eccentric drive cam is 89, and an example of a ball-bearing for this cam arrangement is 88. The reciprocating motion is transmitted to the pump chambers, for example 90 of FIG. 5, wherein a silastic pump diaphragm, for example 91 of FIG. 5, is alternately deformed and stretched to produce a pumping action caused by the varying displacement in the chamber 90. Return spring members, for example 92 of FIG. 4, by limiting the return force of the piston, controls the suction produced in chamber 90. By this means cavitation on the suction side of the pump is regulated. The multiple check valves 96 through 96.7 regulate the flow and prevent back flow during the pumping cycle. The metering system consists of pumps 94 and 94.1, which are coupled by a metering regulation arm 95. It can be seen from FIG. 6 that the metering pump 94.1 is driven by an eccentric drive cam system which also drives a pump lever. Pump 94 draws in the concentrated electrolyte solution, and though its displacement is adjustable, it will be set to displace about one-fortieth the displacement of the main pump. The two metering pumps are mechanically locked together so that the fixed ratio of displacement is maintained, even if the volume pumped should diminish due to suction pressure limitation as described above. The pump assembly is mounted on a rigid base 100.

As has also been pointed out, the pump is designed to deliver a pressure of about 600 to 700 p.s.i. and is limited to a suction pressure —5 p.s.i. The pump draws approximately 21 ml. per minute of filtrate from the ultrafilter, the patient's heart providing the pressure to force the blood into the ultrafilter. The micro-pump 90 supplies the full 21 ml. per minute to the second (hyper) filtration stage, such that about five-sixths of the water supplied to this stage passes through the hyperfilter. The metering pump system is designed to handle up to the full 21 ml. per minute flow, hence it will always be able to pump the efflux from the second filtration stage and will always operate in the suction limit condition. This makes for stable operation of the entire high-pressure micro-pump and metering system.

Turning to FIG. 7, the nature of the pump chamber 90, the input and output multiple check valves 96 and 96.7 and the drive system comprising a cam 89, drive shaft means 86 and 103 (driven by the motor) and piston 101 can be seen more clearly. Spring member 92 provides the means for returning the piston 101 to its extreme position and prevents it from following the cam in the event that the suction pressure limit is exceeded, and by this means prevents cavitation. The diaphragm 91 is permanently bonded to the base 100 and to the piston 101, but is free to move on the sides. Inlet and outlet ports and channels 107 and 108 may communicate with the chamber 90 separately, or through a common channel, since the multiple check valves 96 and 96.7 control the directional movement of the fluid that is being pumped.

The pump is in operation continuously, hence we prefer a high efficiency pump with a long fatigue life so as to permit a year or more of trouble-free operation. As has been pointed out, 500 to 700 p.s.i. is the preferable pressure output maximum to overcome osmotic back pressure. Furthermore, pressures in the range of 500–700 p.s.i. are considered optimum from the standpoint of membrane life. A volume flow of 21 ml./min. is provided for on the basis of purifying 30 liters of plasma per day. This figure of 30 liters/day is chosen on the basis of engineering and design considerations; physiologically a range of 20 to about 90 liters/day may be acceptable, the object being to remove from about 8 to about 24 grams/day of urea, as a standard, from the bloodstream.

The acceptable filtration characteristics affect, as has been pointed out, the pump characteristics required. Generally, the ultrafilter should pass solutes of molecular weight less than 5,000 and it is permissible to pass some solutes of molecular weights as high as 30,000. Blood channels in the ultrafilter should permit as high a flux as is consonant with low polarization or caking, and with preservation of blood platelets and red cells. Similar considerations (except with regard to preservation of blood platelets) apply to the hyperfilter.

One of the desirable features of this invention is the small amount of volume occupied by the make-up solution, which supplies about 200 to 300 grams of solids/day to the reconstittued whole blood returned to the patient's veins. The solution can have a concentration of about 200 to 500 mg./ml.; hence, only one or two daily loadings of the small (less than one liter) make-up reservoir are required. We prefer two loadings per day of about 130 grams of solids in 300 ml. of solution.

Figure 1B:
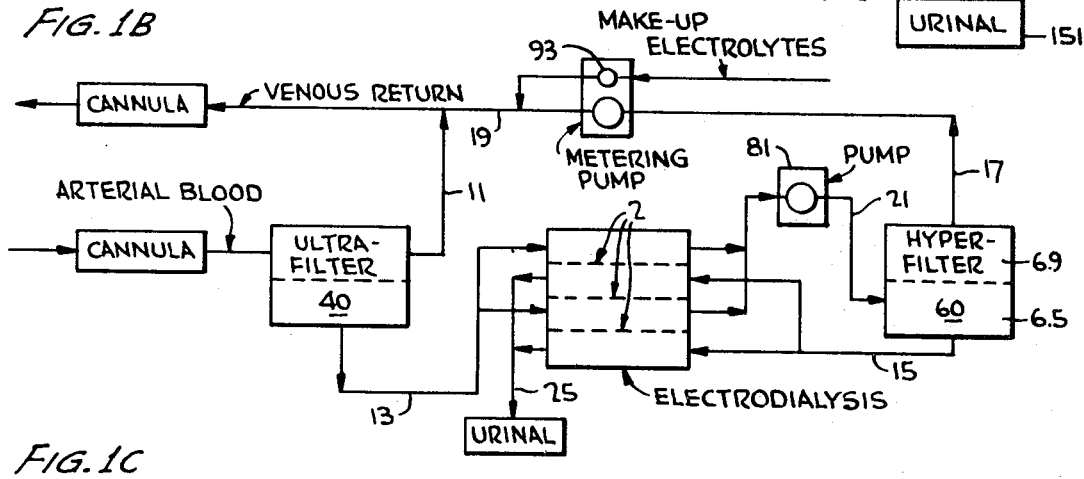
Figure 1C:
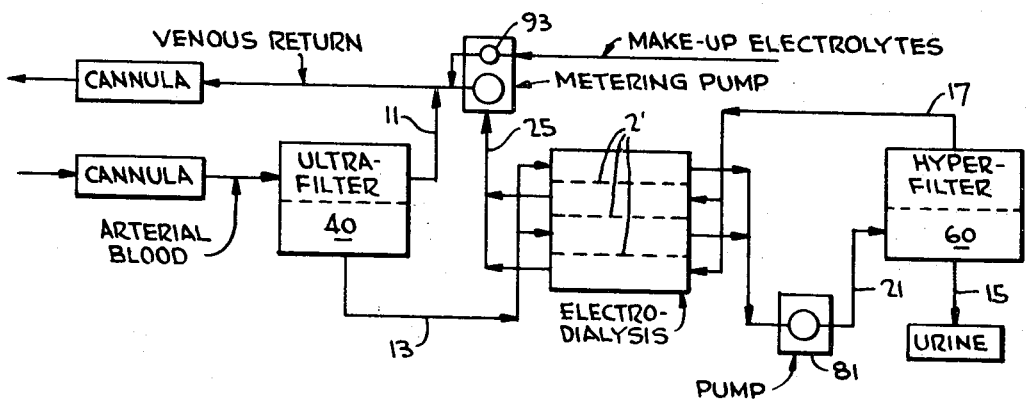

Alternative embodiments of this invention can be understood by referring to FIGS. 1B, 1C and 1D.

Referring to FIG. 1B, the ultrafiltrate 13, instead of being routed directly to the hyperfilter is first passed through a low-power electrodialyzer with membranes 2. The charge differential in the electrodialyzer separates the electrolyte from the non-electrolyte solutes with the help of the membranes. The electrodialyzed aqueous solution of primarily non-electrolyte solutes is then passed through tre hyperfilter. The material rejected by the hyperfilter 15 is then returned to the electrodialyzer for further removal of electrolytes. As a result of the electrodialysis treatment, the waste material 25 deposited in the urinal is in the instant embodiment far more concentrated in terms of electrolytes than is the waste from the hyperfilter in the basic embodiment. Consequently, the difference in concentration of electrolyte between the filtrate side of the hyperfilter 6.9 and the retained solute side 6.5 is sharply reduced.

The osmotic pressure across the hyperfilter, which tends to force water from 6.9 to 6.5 and solutes from 6.5 to 6.9 is correspondingly reduced. As a result, the pressure of the pump and hence the energy expended can be reduced, and less water is lost to waste 25. The power saved in pumping may be used by the electrodialysis unit to provide the charge differential. In the basic embodiment described above, i.e. FIG. 1A, pressures in the range of 500 to 700 pounds per square inch (hereinafter abbreviated p.s.i.) are required to force water through the hyperfilter. This is so partly because the cellulose acetate skin membranes are tight enough to prevent the passage of small solutes and hence require a substantial pressure drop to force the water through. But a large contributing factor is the high osmotic back pressure which must be overcome before water can pass from the concentrated side 6.5 to the fresh water side 6.9. For a concentration ratio of six, for example, the back osmotic pressure of the concentrated side 6.5 would be approximately 550 p.s.i. In the instant embodiment the amount of filtrate 17 obtained can be increased without necessity of overcoming increased osmotic pressure on the filtrate side 6 of the hyperfilter. Under these conditions, the rejected waste or urine 25 is concentrated to the point where only two liters of this waste are formed daily. It is to be understood that the higher rate of urine formation in the basic embodiment is not a serious disadvantage in that the patient, by drinking an average of less than a cup per hour, can easily replace five liters of fluid per day.

Referring to FIG. 1C, where still another embodiment of the invention is schematically outlined, it will be seen that electrolytes are utilized while non-electrolytes 15 retained by the hyperfilter are discarded. After leaving the electrodialyzer, instead of flowing to the urinal, as was the case in the previous embodiment, the electrolyte solutes 25 flow to the metering pump for mixture with the ultrafiltrate 11 and ultimately for venous return. The water retained by the hyperfilter 15 is thus primarily urea, creatinine, uric acid, sugars and the like. The efflux of the electrodialyzer 25 is free of toxic materials such as urea, and is therefore essentially suitable for venous return. As in the embodiment shown in FIG. 1B, the osmotic pressure from the filtrate side 6.9 of the hyperfilter 6.9 and the concentrated side 6.5 is reduced, and the rate of urine production is again cut back to about two liters per day. Another feature of this embodiment is the smaller amount of make-up solution required. Unlike either of the embodiments shown in FIGS. 1A and 1B, the sodium:potassium ratio of the efflux from the electrodialyzer 25 is approximately the same as that of the arterial blood. A necessary function of the natural kidney is to increase the sodium:potassium ratio of the blood by preferential selection of potassium ion for removal as waste in the urine. Therefore, it is another feature of the instant embodiment that means are provided for performing this electrolyte-adjustment function by partial removal of potassium ion. The amount of make-up solution needed will be dependent upon the potassium balance. Accordingly, a reduction in the amount of electrolyte by approximately one-half is feasible.

In FIG. 1D still another embodiment of the invention is schematically illustrated. In this embodiment, the filtering surface of the hyperfilter is a so-called mosaic membrane, which consists of tiny patches of membranes. At the patch boundaries, lateral surface currents prevent the phenomenon known as electric polarization. In any high filtration means, such as the hyperfilter of this invention, the concentration of solutes on the filtrate side 6.9 will be very much lower than on the retention side 6.5. In addition, the local concentration 7 at the retaining surface of the hyperfilter will be higher than the general concentration of the retained solution 6.5. Thus, there is a repulsion or back pressure from the local area 7 directed toward the rest of the retained solution 6.5. At the patch boundaries of the mosaic filter, however, positively or negatively charged species flow freely through the filter due to the relative lack of polarization. Therefore, the filtrate 17 will contain electrolytes and pure water, while the rejected matter 15 will contain urea, creatinine, uric acid, sugars and the like. It can readily be seen that the instant embodiment is nearly as sophisticated as a natural kidney. As a result, like the embodiment of FIG. 1C, the required amount of make-up electrolytes is considerably reduced. The complete hyperfilter would consist of mosaic membranes in series with cellulose acetate membranes in order to permit controlled electrolyte passage into the hyperfiltrate.

EXAMPLE

A wearable artificial kidney made according to this invention, more particularly according to FIG. 1A, was found to have the size and weight specified in Table 1 below and was found to be wearable on a patient's body without unduly restricting the movements of the patient.

TABLE I

| Component: | Volume, cc. | Weight, grams |
|---|---|---|
| Ultrafilter | 100 | 200 |
| Hyperfilter | 35 | 150 |
| Micropump and motor assembly | 100 | 200 |
| Electrolytes and cannister | 320 | 400 |
| Urinal (full) | 500 | 500 |
| Batteries [1] | 300 | 800 |
| Miscellaneous tubing, wiring, etc | 100 | 200 |
| Totals | 1,455 | 2,450 |

[1] A commercially available 6-volt, 26.4 watt-hour (8.8 hours at 3 watts) nickel-cadmium battery pack, consisting of two cells.

Data pertaining to the blood composition of a person with normally functioning kidneys, a uremic patient, and a uremic patient on a low protein diet making continuous use of the artificial kidney of this invention are shown below in Table II.

TABLE II.—PLASMA COMPOSITION

| | Normal | Uremic patient [1] | | Wearable kidney (Low protein diet) |
|---|---|---|---|---|
| | | Before hemodialysis | After hemodialysis | |
| Substance: | | | | |
| Urea | 25.0 | 90.0 | 30.0 | 40.0 |
| Creatinine | 1.5 | 17.0 | 7.0 | 5.0 |
| Uric acid, mg./100 ml | 4.0 | 13.0 | 4.0 | 2.7 |
| Glucose | 80.0 | 80.0 | 80.0 | 80.0 |
| Potassium | 4.6 | 6.5 | 3.5 | 4.6 |
| Sulfate | 1.1 | ? | ? | 1.1 |
| Phosphate meq./l | 1.8 | 9 | 5.0 | 1.8 |
| Bicarbonate | 27.0 | ? | ? | 27.0 |
| Sodium | 140.0 | 135.0 | 135.0 | 140.0 |

[1] Leonard, E. F., Large Scale Hemodialysis: Engineering and Economic Considerations. Trans. Amer. Soc. Artificial Internal Organs. 11:25 (1965).

Note the erratic changes in the plasma composition of the uremic patient before and after dialysis as compared with the artificial kidney of this invention. Note also the excessive loss of potassium after dialysis and the improper sodium:potassium ratio existing both before and after dialysis. Further data pertaining to the performance of the artificial kidney of this invention are given below in Table III:

TABLE III.—CHEMICAL LOSS AND MAKE-UP BALANCE
(Daily)

| | Grams | | |
|---|---|---|---|
| | Normal excretion | Wearable kidney, urine | Make-up required |
| Substance: | | | |
| Urea | 24 | 12.0 | 0 |
| Creatinine | 1.5 | 1.5 | 0 |
| Uric acid | 0.8 | 0.8 | 0 |
| Glucose | 0 | 24.0 | 24.0 |
| Potassium | 3 | 5.4 | 2.4 |
| Sulfate | 1.1 | 3.2 | 2.1 |
| Phosphate | 1.2 | 5.1 | 3.9 |
| Bicarbonate | 1.5 | 49.0 | 48.0 |
| Sodium | 4.0 | 94.0 | 90.0 |
| Chloride | 9.5 | 108.0 | 99.0 |
| Total electrolyte make-up | | | 269.0 |

It can be seen from the above example that the compact size of the artificial kidney of this invention is only one among several advantages. Therefore, it is within the scope of this invention to construct a non-wearable artificial kidney employing ultrafiltration and hyperfiltration in the manner disclosed. It is also within the scope of this invention to modify the nature of the power source. Any source of electric power, portable or non-portable, can be used with this invention. For example, instead of the six volt supply disclosed in the example, a twenty-four volt supply with a 1.2 ampere-hour capacity would be only slightly heavier and would work equally well.

Many other modifications of this invention are possible. Various motor and pump arrangements could be substituted without departing from the spirit and the scope of the invention. Various modifications of the membranes used in the filters could be made. For example, it would be advantageous to modify the ultrafilter membrane such that protein caking is further reduced. Thus, it would be within the scope of this invention to use an ultrafilter comprising membranes in which proteolytic enzymes are chemically bonded or otherwise permanently affixed to the membrane surface. Another modification of this invention would be the inclusion of so-called fail-safe features to protect against punctures, leaks, or ruptures in the fluid lines of the system, as well as clogging of the filters. Thus, it is within the scope of this invention to include various shut-down switches which are automatically activated by significant changes in flow or concentration at various points of the system. For example, a sensing switch can be incorporated in the system between the metering pumps and venous return to measure the ionic conductivity of the material, i.e., the make-up solution and filtrate from the hyperfilter, to be admixed with the IHB. In the event the metering pumps or filters are malfunctioning and the filtrate has not been adjusted to the proper electrolyte concentration, as determined by the ionic conductivity of the material, an automatic shut-off switch for the motor will be actuated preventing the pumping of pure water into the wearer's system. Additionally, a similar sensing switch can be incorporated in the system to measure the ionic conductivity of the waste material in the urinal. Again, if excessive material is passing through the hyperfilter as waste, as determined by the ionic conductivity, an automatic shut-off will stop the motor, alerting the wearer of a malfunction and to a need for a maintenance check. Various other design features may be incorporated, particularly with regard to the manner in which a compact artificial kidney of this invention is adapted to be worn on the body. For example, the urinal and electrolyte make-up cannisters may be adapted to fit comfortably on various parts of the body, such as the legs or hips. Other elements of the device may be adapted to be worn around the waist, built into clothing or the like.

Still another modification of this invention is the inclusion of dextrose or other non-electrolytes in the make-up reservoir so that the patient need not replace these materials by oral ingestion. It is also within the scope of the invention to use anticoagulants such as heparin or coumadin in the artificial kidney system as an added safety factor with regard to possibility of clotting, although the materials used in the system are non-thrombogenic.

It is to be understood that the wearable artificial kidney of this invention also may be used with peritoneal fluid from the peritoneum instead of blood as a means for removing urea creatinine, uric acid, etc., from the body and thereby reducing the concentration of these toxic substances in the blood. The expression blood, therefore, as used in the specification and claims is intended to include peritoneal fluid as well as arterial blood.

When the kidney is used with peritoneal fluid, the canulas are inserted into the peritoneal cavity rather than the arteries and a circulating pump is used to withdraw the peritoneal fluid and to pass it to the ultra filter of the kidney. As noted above, when the kidney is used with blood, the pump is not necessary beacuse the human heart supplies the pressure needed to pass the blood to the ultra filter.

As the peritoneal fluid passes through the ultra filter it cleanses the peritoneal fluid in the same manner as the blood is cleansed and a make-up solution is similarly added to the fluid returning to the peritoneal cavity. Thus, the artificial kidney of this invention can be used equally well with either peritoneal fluid or blood and without any significant change in the construction of the device.

When used with peritoneal fluid, the make-up solution is similarly added to the fluid returning to the peritoneal cavity. Thus, the artificial kidney of this invention can be used equally well with either peritoneal fluid or blood and without any significant change in the construction of the device.

When used with peritoneal fluid, the make-up solution metered into the hyper-filtrate for return to the peritoneal cavity should contain dextrose and/or sorbitol in a concentration of about 1% by weight. As is well known to those skilled in the art of peritoneal dialysis, dextrose or sorbitol provides an osmotic induced withdrawal of water from the body into the peritoneal fluid. This is required because the kidney of this invention rejects about 2 liters of water per day through the waste line 15 and this water is provided by withdrawing the water from the body into the peritoneal fluid.

In short, the above description of this invention is merely illustrative of its basic principles, and many modifications not shown or described may be made without departing from the spirit and scope of the invention itself. The true scope of this invention is to be determined by reference to the claims which follow.

What is claimed is:

1. An apparatus for removing toxic substances from blood comprising:
   a macromolecular filtration means,
   means for conveying blood to the macromolecular filtration means,
   a water-purification means,
   a means for conveying the filtrate passed by the macromolecular filtration means to the water-purification means,
   said conveying means being constructed and arranged to permit the interposition between the said macromolecular filtration means and the said water-purification means of a means for overcoming osmotic back pressure in the water-purification means, and
   means for reconstituting whole blood from (1) the residue retained by the macromolecular filtration means, and (2) the purified aqueous medium produced by the water-purification means comprising means for conveying together the residual efflux from the macromolecular filtration means and the product efflux from the water-purification means.

2. An apparatus as claimed in claim 1 in which the water-purification means comprises a plurality of membranes with hyperfiltration characteristics enclosed and supported in a suitable housing, said housing having influx means, purified aqueous filtrate efflux means and toxic solute efflux means.

3. A hyperfiltration means as claimed in claim 2 in which the said plurality of hyperfiltration membranes comprise cellulose acetate.

4. A hyperfiltration means as claimed in claim 2 in which the filtering element comprises at least one homogenous membrane and at least one mosaic membrane, said mosaic membrane comprising a patchwork of individual membrane segments.

5. The water-purification means as claimed in claim 2 in which the said influx means, the said filtrate efflux means and the said toxic solute efflux means are so constructed and arranged that the flow from the influx means to the filtrate efflux means is smooth and uninterrupted and is parallel to the filtering surfaces of the said hyperfiltration membranes.

6. A hyperfiltration means as claimed in claim 5 in which the said membranes are planar.

7. A hyperfiltration means as claimed in claim 5 in which the said membranes are tubular.

8. The hyperfiltration means as claimed in claim 7 in which said tubular membranes have an outside diameter of less than 1 mm.

9. An apparatus as claimed in claim 1 in which the water-purification means comprises:
   an electrodialysis means having influx means for the filtrate from the said macromolecular filtration means, efflux means for the non-electrolyte product of electrodialysis, a second influx means, and a second efflux means,
   a filtration means comprising a hyperfiltration element supported and enclosed in a suitable housing having influx means, filtrate efflux means and toxic solute efflux means, said non-electrolyte efflux means of said electrodialysis means being in communication with means for overcoming osmotic back pressure, the input means to said filtration means being in communication with the means for overcoming osmotic pressure, the toxic solute efflux means being in communication with the second influx to the electrodialysis means such that the toxic solutes conveyed thereto will mix with the aqueous electrolytes retained within the electrodialysis means, and the second efflux means being connected with means for discarding electrolytes and toxic solutes.

10. An apparatus according to claim 1 in which the water-purification means comprises:

an electrodialysis means having influx means for the filtrate from said macromolecular filtration means, efflux means for the non-electrolyte product of electrodialysis, a second influx means, and a second efflux means, and a filtration means comprising a hyperfiltration element enclosed and supported in a suitable housing having influx means, efflux means for a filtrate, and efflux means for retained toxic solutes, the non-electrolyte efflux means being connected by suitable communication means with said means for overcoming osmotic back presure and said means for overcoming osmotic back pressure being so arranged as to convey by suitable communication means the non-electrolyte product to the filtration input means, the toxic solute efflux means being so constructed and arranged as to permit the discarding of the toxic solutes, the filtrate efflux means being in communication with the second influx means of the electrodialysis means, and the second efflux means of the electrodialysis means being in communication with said means for reconstituting whole blood.

11. An apparatus as claimed in claim 10 in which the electrodialysis means includes membranes which are permeable to sodium ions and essentially impermeable to potassium ions.

12. An apparatus as claimed in claim 1 in which the means for overcoming osmotic pressure comprises a cam-driven reciprocating pump with suction-limiting means.

13. An apparatus as claimed in claim 1 in which the macromolecular filtration means comprises a plurality of ultrafiltration membranes so constructed and arranged that the flow of arterial blood is smooth and uninterrupted and is parallel to the filtering surfaces of the membranes.

14. An ultrafiltration means as claimed in claim 13 in which the membranes are planar.

15. An ultrafiltration means as claimed in claim 13 in which the membranes are tubular.

16. Apparatus as claimed in claim 13, in which the macromolecular filtration means comprises a stack of rectangular ultrafiltration membrane sheets spaced by rows of filaments parallel to each other and to the edges of the sheets, each pair of spaced membrane sheets being separated from the pair immediately above and the pair immediately below by sheets of porous support material disposed parallel to and contiguous with the surfaces of the membrane sheets.

17. A macromolecular filter as claimed in claim 16 in which the membrane sheets comprise a coagulated mixture of poly(sodium styrene sulfonate) and poly(vinylbenzyltrimethyl ammonium chloride).

18. An apparatus as claimed in claim 1 in which the said means for reconstituting whole blood comprises:

a make-up electrolyte fluid reservoir, a communicating conduit between the reservoir and a means for introducing small increments of fluid from the reservoir into a means for conveying the product efflux away from the said water-purification means, and means for communication between the small-increment introduction means and the product efflux conveying means and the said residue retained by the macromolecular filtration means.

19. An apparatus as claimed in claim 18 in which the said make-up electrolyte fluid reservoir contains less than 300 grams of solids dissolved in less than 1 liter of water.

20. An apparatus according to claim 1 in which the means for reconstituting whole blood comprises:

a reservoir for make-up electrolyte fluid, a communicating conduit between the reservoir and a metering pump, a communicating conduit between said water-purification means and the metering pump, means for combining the output from the metering pump into the single homogeneous fluid, and means for mixing the combined flow with the residue retained by the said macromolecular filtration means.

21. An apparatus as claimed in claim 20 in which the metering pump is mechanically linked to a means of overcoming osmotic back pressure in the water-purification means comprising a pump with a greater displacement than the metering pump.

22. An artificial kidney comprising:

an arterial cannula, a first filtration element impermeable to macromolecules, a conduit means providing communication between the arterial cannula and the first filtration element, said conduit means being so arranged that the arterial blood flows smoothly and uninterruptedly over the filtering surface of the ultrafiltration element, a second conduit means providing communication of the filtrate of the first filtration element to a high-pressure pump, a second filtration element permeable to pure water but essentially impermeable to aqueous solutes, a third conduit means providing communication between the high-pressure pump and the second filtration element, means for introducing, at a predetermined rate, increments of an aqueous solution of electrolytes into the filtrate flowing from the second filtration element, means for conveying the resulting mixture of said second filtrate and said electrolyte solution to the macromolecular residue retained by the first filtration element, and means for conveying the resulting mixture of said residue, said second filtrate and said electrolyte solution to a venous cannula.

23. A method of removing toxic substances from the blood comprising:

subjecting arterial blood to filtration such that blood having a high hematocrit is retained and a first aqueous filtrate including toxic solutes is permitted to pass, subjecting this first filtrate to a second filtration such that toxic solutes are retained and a second aqueous filtrate is permitted to pass, mixing this second filtrate with a controlled amount of make-up electrolyte solution, and combining this mixture of second filtrate and electrolytes with the blood retained in the first filtration so as to form reconstituted whole blood suitable for venous return.

24. The method as claimed in claim 23 in which electrodialysis is used in connection with the second filtration such that the osmotic back pressure from the second filtrate to the retained toxic solutes is reduced.

25. The method as claimed in claim 23 in which selective electrodialysis is used to recover sodium ions from the retained toxic solutes, and these sodium ions are then added to the second filtrate.

(References on following page)

References Cited

UNITED STATES PATENTS

| | | | |
|---|---|---|---|
| 2,035,851 | 3/1936 | Walker | 210—346 |
| 3,246,764 | 4/1966 | McCormack | 210—321 |
| 3,401,798 | 9/1968 | Nyrop | 210—346X |
| 3,483,867 | 12/1969 | Markovitz | 210—23X |

OTHER REFERENCES

Henderson et al., "Blood Purification by Ultrafiltration and Fluid Replacement (Diafiltration)," from Transactions, American Society for Artificial Internal Organs, vol. 13, pub. June 16, 1967, 410 pp., pp. 216–226 relied on.

Michaels, "Polyelectrolyte Complexes," from Industrial and Engineering Chemistry, vol. 57, No. 10, October 1965, pp. 32–40 relied on.

FRANK A. SPEAR, JR., Primary Examiner

U.S. Cl. X.R.

128—214; 210—73, 258, 259, 321, 323, 346, 434, 486